Patented Jan. 2, 1923.

1,441,063

UNITED STATES PATENT OFFICE.

NIELS C. CHRISTENSEN, OF SALT LAKE CITY, UTAH.

PROCESS OF TREATING SULPHIDE ORES OF LEAD, SILVER, AND COPPER.

No Drawing.　　Application filed October 8, 1919. Serial No. 329,397.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Sulphide Ores of Lead, Silver, and Copper, of which the following is a specification.
This invention relates to the treatment of the sulphide ores of silver, lead and copper by a process of lixiviation. The process treats ores or concentrates containing galena, argentite and chalcocite by lixiviation without any preliminary treatment, i. e., treats the natural sulphides without any preliminary oxidizing, sulphating or chloridizing roast.

My process consists in treating the finely ground ore with a hot concentrated solution of one or more of the common chlorides containing a small amount of ferric chloride. Either ferric chloride or ferric sulphate may be used but the former is preferable in order to avoid contamination of the solution with sulphates. The ferric sulphate added to the concentrated chloride solution forms ferric chloride immediately, but the sulphates build up in the solution and decrease the solubility of the metal chlorides.

I have found that a hot solution of any of the common chlorides such as NaCl, $CaCl_2$, $MgCl_2$, or $FeCl_2$, containing a small amount of ferric chloride rapidly dissolves galena, argentite and chalcocite. Solutions of KCl, $NH_4Cl$ and $MnCl_2$ containing ferric chloride also act in the same way but would rarely be used. Zinc chloride solution acts similarly but is much less active owing to the more limited solubility of the silver, lead and copper chlorides in this solution. Ferric chloride alone is the least suitable of the chlorides for use as the concentrated solution of the process (as well as the active ingredient of the solution) owing to the very slight solubility of the chlorides of lead and silver in a concentrated ferric chloride solution, and a concentrated ferric chloride solution is entirely unsuited to the precipitation of the free metals therefrom as the entire solution would have to be reduced to the ferrous condition before the metals (as such, not as chlorides) could be precipitated therefrom. The solutions which would be used in most cases in my process are those containing NaCl, or a mixture of NaCl and some of the following: $CaCl_2$, $MgCl_2$, and $FeCl_2$. In some places where cheap $CaCl_2$ is obtainable it might be used in preference to NaCl.

The action of the ferric chloride, contained in the concentrated chloride solution, on the galena, argentite, and chalcocite is indicated in the following equations:

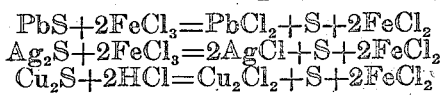

$$PbS+2FeCl_3=PbCl_2+S+2FeCl_2$$
$$Ag_2S+2FeCl_3=2AgCl+S+2FeCl_2$$
$$Cu_2S+2HCl=Cu_2Cl_2+S+2FeCl_2$$

The lead, silver and copper are dissolved as chlorides in the hot chloride solution, the sulphur separated as free sulphur, and the ferric chloride is reduced to the ferrous condition. The action upon the galena is very rapid and is somewhat slower on the chalcocite and still slower on the argentite. The silver contained in the galena is brought into solution just as rapidly as the galena. The time of treatment necessary to bring the metals into solution will vary with the fineness of grinding, the temperature of the solution, the concentration of the ferric chloride in the solution, and the concentration of the lead, copper and silver chlorides in the solution. Fine grinding approaching 100 mesh or finer is preferable in most cases.　The solutions act most vigorously near the boiling point of the solution and hot solutions are preferable in all cases. A slight excess of ferric chloride above the amount theoretically necessary to bring the metals into solution is desirable but a large excess is not necessary and is not advantageous in the practical operation of the process. As the concentration of the solution in lead, silver and copper increases the rapidity of the action decreases and becomes extremely slow as the solution nears saturation, so that it is not advantageous to attempt to use solutions too near saturation in regard to the lead, silver and copper. A treatment of from 15 to 30 minutes with a hot solution containing a small percentage of excess ferric chloride is sufficient to bring the lead, silver and copper into solution. The S given off during treatment may be collected without difficulty as it rises to the surface of the hot solution and may be skimmed off. The treatment in the practical operation of the process is preferably carried out by agitating the finely ground ore or concentrate with the hot chloride solution until the lead, silver and copper are in solution, and then decanting or filtering the hot pregnant solution away from the ore. It is advantageous to have a small amount of HCl present in the solution to reduce the hydrolysis of the ferric chloride and prevent precipitation of ferric hydroxide.

The method of precipitation of the metals from the pregnant solution will vary with the quantity and number of metals in the ore and the products desired. If the ore contains only galena, the solution may be cooled and the lead chloride separated as described in my patent application Serial Nos. 327,400 and 327,401 or the lead may be precipitated by electrolysis as described in application #327,401. If the solution contains silver this is preferably precipitated with metallic lead before the precipitation of the lead or lead chloride. If the solution contains copper as well as silver and lead the silver is preferably first precipitated with metallic copper, the copper then precipitated with metallic lead, and the lead finally precipitated by one of the methods mentioned. The silver or copper may also be precipitated with metallic iron, as may also the lead, but the iron acts slowly upon the lead chloride in the concentrated chloride solutions, and the other methods for the precipitation of the lead are preferable. As before mentioned the exact method of precipitation will depend upon the contents of the ore and the products desired. My preferred method of precipitation of the lead from solution is to electrolyze in a cell with a diaphragm between the anode and cathode compartments, the solution first passing into the cathode compartment where the lead is precipitated, and then into the anode compartment where the ferrous chloride is changed to ferric chloride, thus regenerating the solution for the treatment of more ore.

If the lead is precipitated as a chloride by cooling, my preferred method of treatment is to electrolyze the melted lead chloride to secure lead and chlorine, and to pass the chlorine thus generated into the ferrous chloride solution and thus regenerate the ferric chloride for the treatment of more ore.

It will be apparent from the foregoing that only a small excess of ferric chloride should be used as all the ferric iron must be reduced to the ferric condition before the precipitation of the gold, silver, copper or lead.

The chloride solution does not act upon pyrite or chalcopyrite, or upon some of the complex arsenical silver minerals, but does act upon zinc blende to a limited extent. It is practically impossible, however, to secure a complete extraction of the zinc unless a very large volume of solution containing a considerable excess of ferric chloride is used. The process is therefore not well adapted to the treatment of zinc sulphide ores for the recovery of the zinc but is suitable for the recovery of the lead from these ores, as the solution acts more rapidly on the galena than on the blende.

As before mentioned any of the common chlorides except zinc chloride and ferric chloride may be used as the main solution in the process, but those ordinarily used will be $NaCl$ or $CaCl_2$ or a mixture of $NaCl$ with other chlorides.

As it is obviously impossible to describe all the variations in the details of the application of my process to all kinds of ores, I do not wish to be limited by the foregoing brief description but by the appended claims.

By my process I have secured practically complete extractions of the lead and silver from galena ores and concentrates, and have secured practically complete extractions of the lead and silver and copper from the galena and chalcocite in ores containing these minerals together with pyrite and chalcopyrite, and have left the pyrite and chalcopyrite in excellent condition for recovery by flotation. The silver and copper locked up in the pyrite and chalcopyrite are recovered with these minerals. By my process I have also made practically complete extractions of the copper in the form of chalcocite in copper concentrates and extractions of from 95–98% of the silver in ores containing the silver as a sulphide.

From the foregoing it will be apparent that my process has a great many advantages over the old methods in which the ore is subjected to an oxidizing, sulphating or chloridizing roast and thereafter lixiviated for the recovery of the metals, both in the cost, simplicity of treatment and completeness of extraction.

Having described my process what I claim and desire to patent is:

1. The process of treating ores containing some of the sulphide minerals of lead, silver and copper which consists in treating said ores with a hot concentrated chloride solution containing ferric chloride and thereby dissolving the metals of said minerals in said solution as chlorides, and separating said pregnant solution containing said metal chlorides, and precipitating said metals from said pregnant solution.

2. The process of treating ores containing some of the sulphide minerals of lead, silver and copper which consists in treating said ores with a hot concentrated chloride solution containing ferric iron in solution, and thereby dissolving the metals of said minerals in said solution as chlorides, and separating said pregnant solution containing said metal chlorides, and precipitating said metals from said pregnant solution.

3. The process of treating ores containing some of the sulphide minerals of lead, silver and copper which consists in treating said ores with a hot concentrated chloride solution containing ferric chloride and thereby dissolving the metals of said minerals in said solution as chlorides, and separating said pregnant solution containing said metal chlorides, and precipitating the silver with metallic copper, the copper with metallic lead, and the lead by electrolysis from said solution.

4. The process of treating ores containing some of the sulphide minerals of lead, silver and copper which consists in treating said ores with a hot concentrated chloride solution containing ferric chloride, and thereby dissolving the metals of said minerals as chlorides, and freeing the metallic sulphur, and reducing the ferric chloride to the ferrous condition; separating said pregnant solution containing said chlorides from the remainder of the ore, and precipitating the metals therefrom by electrolysis, and using the chlorine generated in said electrolysis to convert ferrous chloride formed by above said treatment to the ferric condition, and using the ferric solution thus formed for the treatment of more ore.

5. The process of treating ores containing some of the sulphide minerals of lead, silver and copper, which consists in treating said ores with a hot concentrated chloride solution containing ferric chloride and thereby dissolving the metals of said minerals in said solution as chlorides, and separating said pregnant solution containing said metal chlorides from the residue of ore and precipitating the silver with metallic copper, the copper with metallic lead, and the lead by electrolysis and using the chlorine generated in said electrolysis to convert ferrous chloride formed by above said treatment to the ferric condition and using the ferric solution thus formed for the treatment of more ore.

In testimony whereof I have signed my name to this specification.

NIELS C. CHRISTENSEN.